(12) United States Patent
Shen et al.

(10) Patent No.: US 11,474,635 B2
(45) Date of Patent: Oct. 18, 2022

(54) DISPLAY NOISE FILTER FOR A SENSING DEVICE

(71) Applicant: SYNAPTICS INCORPORATED, San Jose, CA (US)

(72) Inventors: Guozhong Shen, San Jose, CA (US); Xiaodan Mei, Fremont, CA (US); Yongqian Tang, San Jose, CA (US); Ozan Ersan Erdogan, San Jose, CA (US); Joseph Kurth Reynolds, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 17/074,242

(22) Filed: Oct. 19, 2020

(65) Prior Publication Data

US 2021/0117065 A1    Apr. 22, 2021

Related U.S. Application Data

(63) Continuation of application No. 16/654,859, filed on Oct. 16, 2019, now Pat. No. 10,838,547.

(51) Int. Cl.
*G06F 3/041* (2006.01)
*G06F 3/044* (2006.01)

(52) U.S. Cl.
CPC ........ *G06F 3/04162* (2019.05); *G06F 3/0412* (2013.01); *G06F 3/0443* (2019.05); *G06F 3/0446* (2019.05)

(58) Field of Classification Search
CPC .. G06F 3/04162; G06F 3/0446; G06F 3/0412; G06F 3/0443; G06F 1/04
See application file for complete search history.

(56) References Cited

U.S. PATENT DOCUMENTS

| | | | |
|---|---|---|---|
| 6,985,548 B1* | 1/2006 | Jabbar | H04L 27/2662 375/355 |
| 9,740,395 B2 | 8/2017 | Yamada et al. | |
| 2008/0055018 A1 | 3/2008 | Umamichi et al. | |
| 2014/0015549 A1* | 1/2014 | Tu | G06F 3/0446 324/679 |
| 2014/0071066 A1* | 3/2014 | Lee | G06F 3/04166 345/173 |
| 2014/0313847 A1* | 10/2014 | Jeong | G11C 8/18 365/233.12 |
| 2015/0286268 A1 | 10/2015 | Komatsu et al. | |
| 2018/0150168 A1* | 5/2018 | Jung | H03M 1/12 |
| 2021/0072785 A1* | 3/2021 | Hsu | G06F 1/12 |

* cited by examiner

*Primary Examiner* — Sahlu Okebato
(74) *Attorney, Agent, or Firm* — Leydig, Voit & Mayer, Ltd.

(57) ABSTRACT

An input device comprises a plurality of sensor electrodes and a processing system coupled to the plurality of sensor electrodes. The processing system comprises a sensor driver. The sensor driver comprises clock synchronization circuitry, a blocking pulse generator, and a sensor module. The clock synchronization circuitry is configured to receive an external clock signal, and synchronize an internal clock signal with the external clock signal. The blocking pulse generator is configured to generate a first blocking pulse based on the internal clock signal. The sensor module comprises sensing circuitry and is configured to pause acquisition of a resulting signal from a sensor electrode based on the first blocking pulse.

21 Claims, 8 Drawing Sheets

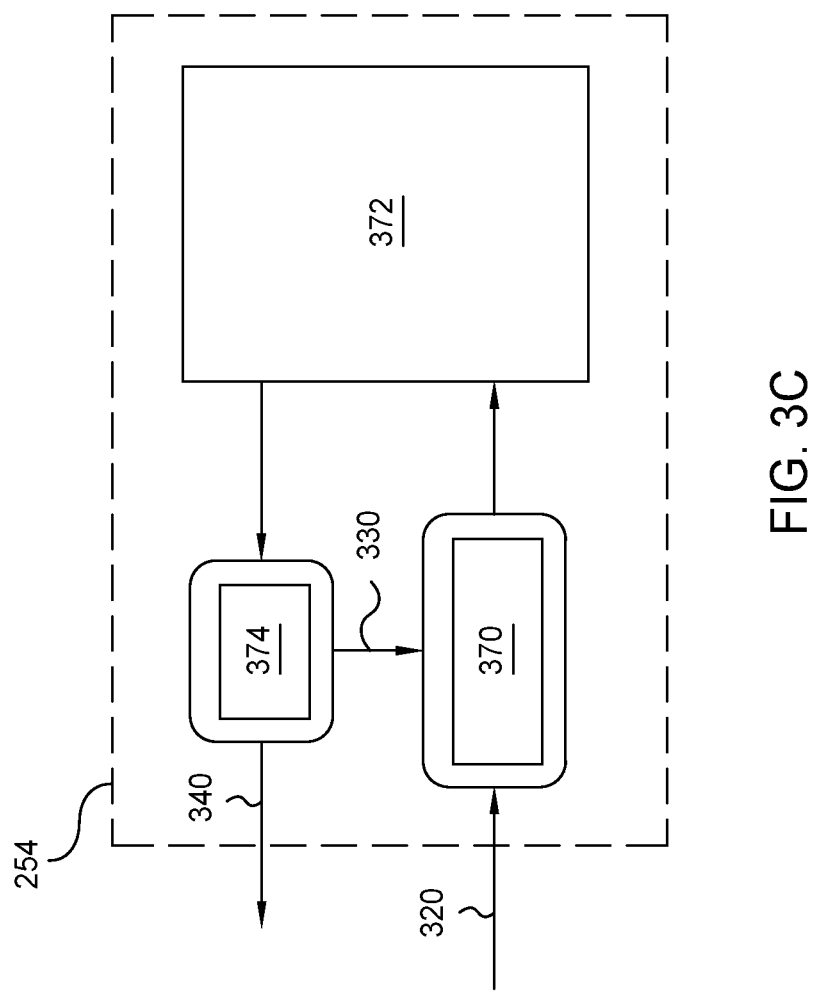

DISPLAY NOISE FILTER FOR A SENSING DEVICE

CROSS REFERENCE TO RELATED APPLICATIONS

This application is a continuation of U.S. patent application Ser. No. 16/654,859, filed Oct. 16, 2019, which is hereby incorporated herein by reference.

BACKGROUND

Field

The disclosure herein is generally related to electronic devices, and more specifically, to reducing interference in input devices.

Description of the Related Art

Input devices including proximity sensor devices may be used in a variety of electronic systems. A proximity sensor device may include a sensing region, demarked by a surface, in which the proximity sensor device determines the presence, location, force and/or motion of one or more input objects. Proximity sensor devices may be used to provide interfaces for the electronic system. For example, proximity sensor devices may be used as input devices for larger computing systems, such as touchpads integrated in, or peripheral to, notebook or desktop computers. Proximity sensor devices may also often be used in smaller computing systems, such as touch screens integrated in cellular phones.

SUMMARY

In one embodiment, a sensor driver comprises clock synchronization circuitry, a blocking pulse generator, and a sensor module. The clock synchronization circuitry is configured to receive an external clock signal, and synchronize an internal clock signal with the external clock signal. The blocking pulse generator is configured to generate a first blocking pulse based on the internal clock signal. The sensor module comprises sensing circuitry and is configured to pause acquisition of a resulting signal from a sensor electrode based on the first blocking pulse.

In one embodiment, a method for capacitive sensing comprises synchronizing an internal clock signal of a sensor driver with an external clock signal provided by a source external to sensor driver and generating a blocking pulse based on a pulse of the internal clock signal. The method for comprises pausing acquisition of a resulting signal from a sensor electrode with receiver circuitry based on the blocking pulse.

In one embodiment, an input device comprises a plurality of sensor electrodes and a processing system coupled to the plurality of sensor electrodes. The processing system comprises a sensor driver. The sensor driver comprises clock synchronization circuitry, a blocking pulse generator, and a sensor module. The clock synchronization circuitry is configured to receive an external clock signal, and synchronize an internal clock signal with the external clock signal. The blocking pulse generator is configured to generate a first blocking pulse based on the internal clock signal. The sensor module comprises sensing circuitry and is configured to pause acquisition of a resulting signal from a sensor electrode based on the first blocking pulse.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments, and are therefore not to be considered limiting of inventive scope, as the disclosure may admit to other equally effective embodiments.

FIG. 3C is a schematic block diagram of clock synchronization circuitry, according to one or more embodiments.

Figure 1:
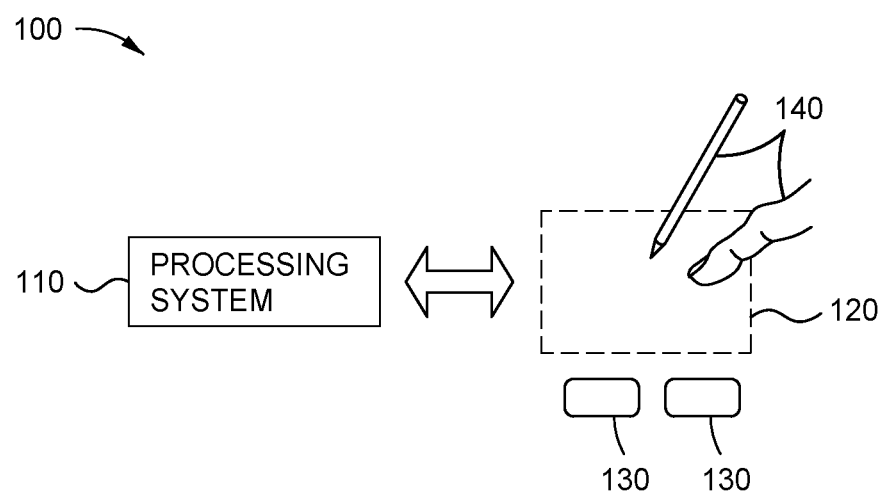
FIG. 1 is a schematic block diagram of an input device, according to one or more embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or the following detailed description.

An example input device 100 as shown in FIG. 1 in accordance with embodiments of the disclosure may be configured to provide input to an electronic system (not shown). As used in this document, the term "electronic system" broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices, e.g., remote controllers and mice, and data output devices, e.g., display screens and printers. Other examples include remote terminals, kiosks, and video game machines, e.g., video game consoles, portable gaming devices, and the like. Other examples include communication devices, e.g., cellular phones such as smart phones, and media devices, e.g., recorders, editors, and players such as televisions, set-top boxes, music players, digital photo frames, and digital cameras. Additionally, the electronic system could be a host or a slave to the input device. The electronic system may also be referred to as electronic device.

The input device 100 can be implemented as a physical part of the electronic system, or can be physically separate from the electronic system. In one embodiment, the electronic system may be referred to as a host device. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In FIG. 1, the input device 100 is shown as a proximity sensor device configured to sense input provided by one or more input objects 140 in a sensing region 120. Example input objects 140 include fingers and styli, as shown in FIG. 1. An exemplary proximity sensor device may be a touchpad, a touch screen, a touch sensor device and the like.

Sensing region 120 encompasses any space above, around, in and/or near the input device 100 in which the input device 100 is able to detect user input, e.g., user input provided by one or more input objects 140. The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiment's sense input that comprises: no contact with any surfaces of the input device 100; contact with an input surface, e.g., a touch surface, of the input device 100: contact with an input surface of the input device 100 coupled with some amount of applied force or pressure; and/or a combination thereof. In various embodiments, input surfaces may be provided by surfaces of casings within which the sensor electrodes (also referred to herein as sensing electrodes) reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images (e.g., of capacitive signals) that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self-capacitance" (also often referred to as "absolute capacitance") sensing methods based on changes in the capacitive coupling between sensor electrodes and an input object (e.g., between a system ground and freespace coupling to the user). In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage, e.g., system ground, and by detecting the capacitive coupling between the sensor electrodes and input objects. In some implementations sensing elements may be formed of a substantially transparent metal mesh (e.g., a reflective or absorbing metallic film patterned to minimize visible transmission loss from the display subpixels). Further, the sensor electrodes may be disposed over a display of a display device. The sensing electrodes may be formed on a common substrate of a display device (e.g., on the encapsulation layer of a rigid or flexible organic light emitting diode (OLED) display). An additional dielectric layer with vias for a jumper layer may also be formed of a substantially transparent metal mesh material (e.g., between the user input and the cathode electrode). Alternately, the sensor may be patterned on a single layer of metal mesh over the display active area with cross-overs outside of the active area. The jumpers of the jumper layer may be coupled to the electrodes of a first group and cross over sensor electrodes of a second group. In one or more embodiments, the first and second groups may be orthogonal axes to each other. Further, in various embodiments, the absolute capacitance measurement may comprise a profile of the input object couplings accumulated along one axis and projected onto the other. In various embodiments, a modulated an input object (e.g., a powered active stylus) may be received by the orthogonal electrode axes without modulation of the corresponding electrodes (e.g., relative to a system ground). In such an embodiment, both axes may be sensed simultaneously and combined to estimate stylus position.

Some capacitive implementations utilize "mutual capacitance" (also often referred to as "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also referred to herein as "transmitter electrodes" or "transmitters") and one or more receiver sensor electrodes (also referred to herein as "receiver electrodes" or "receivers"). The coupling may be reduced when an input object coupled to a system ground approaches the sensor electrodes. Transmitter sensor electrodes may be modulated relative to a reference voltage, e.g., system ground, to transmit transmitter signals. Receiver sensor electrodes may be held substantially constant relative to the reference voltage or modulated relative to the transmitter sensor electrodes to facilitate receipt of resulting signals. A resulting signal may comprise effect(s) corresponding to one or more transmitter signals, and/or to one or more sources of environmental interference, e.g., other electromagnetic signals. Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) chips and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (in another embodiment, with associated firmware) separate from the central processing unit. As another example, the input device 100 may be physically integrated in a phone, and the processing system 110 may comprise circuits and firmware that are part of a main processor (e.g., a mobile device application processor or any other central processing unit) of the phone. In some embodiments, the processing system 110 is dedicated to implementing the input device 100. In other embodiments, the processing system 110 also performs other user input functions, such as operating display screens, measuring input forces, measuring tactile switch state, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system, e.g., to a central processing system of the electronic system that is separate from the processing system 110, if such a separate central processing system exists. In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. The filtering may comprise one or more of demodulating, sampling, weighting, and accumulating of analog or digitally converted signals (e.g., for FIR digital or IIR switched capacitor filtering) at appropriate sensing times. The sensing times may be relative to the display output periods (e.g., display line update periods or blanking periods). As yet another example, the processing system 110 may subtract or otherwise account for a baseline, such that the information reflects a difference between the electrical signals from user input and the baseline signals. A baseline may account for display update signals (e.g., subpixel data signal, gate select and deselect signal, or emission control signal) which are spatially filtered (e.g., demodulated and accumulated) and removed from the lower spatial frequency sensing baseline. Further, a baseline may compensate for a capacitive coupling between the sensor electrodes and one or more nearby electrodes. The nearby electrodes may be display electrodes, unused sensor electrodes, and or any proximate conductive object. Additionally, the baseline may be compensated for using digital or analog means. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of a display screen. For example, the sensing region 120 may overlap at least a portion of an active area of a display screen (or display panel). The active area of the display panel may correspond to a portion of the display panel where images are updated. In one or more embodiments, the input device 100 may comprise substantially transparent sensor electrodes (e.g., ITO, metal mesh, etc.) overlaying the display screen and provide a touch screen interface for the associated electronic system. The display panel may be any type of dynamic display capable of displaying a visual interface to a user, and may include any type of light emitting diode (LED), OLED, cathode ray tube (CRT), liquid crystal display (LCD), plasma, electroluminescence (EL), or other display technology. The input device 100 and the display panel may share physical elements. For example, some embodiments may utilize some of the same electrical components for displaying and sensing. As another example, the display panel may be operated in part or in total by the processing system 110.

A cathode electrode of an OLED display may provide a low impedance screen between one or more display electrodes and the sensor electrodes which may be separated by a thin encapsulation layer. For example, the encapsulation layer may be about 10 um. Alternatively, the encapsulation layer may be less than 10 um or greater than 10 um. Further, the encapsulation layer may be comprised of a pin hole free stack of conformal organic and inorganic dielectric layers.

It should be understood that while many embodiments of the disclosure are described in the context of a fully functioning apparatus, the mechanisms of the present disclosure are capable of being distributed as a program product, e.g., software, in a variety of forms. For example, the mechanisms of the present disclosure may be implemented and distributed as a software program on information bearing media that are readable by electronic processors, e.g., non-transitory computer-readable and/or recordable/writable information bearing media readable by the processing system 110. Additionally, the embodiments of the present disclosure apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
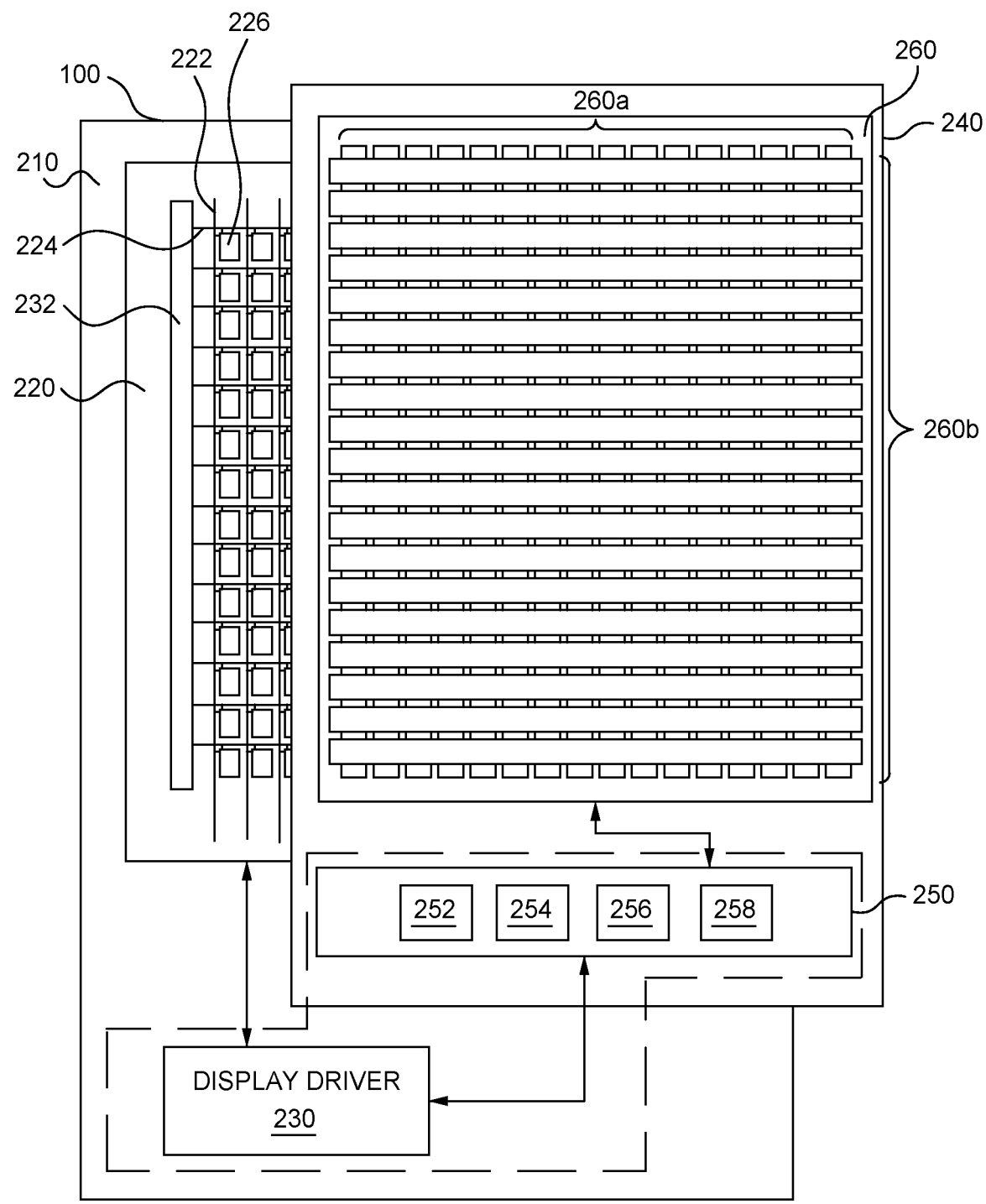
FIG. 2 illustrates an example input device, according to one or more embodiments.

FIG. 2 illustrates an example embodiment of input device 100, according to one or more embodiments. As is illustrated, the input device 100 includes display device 210 and sensing device 240. The display device 210 includes display panel 220 communicatively coupled with display driver 230 and gate selection circuitry 232. The display panel 220 includes data lines 222, gate lines 224, and subpixels 226.

The data lines 222 are coupled to the display driver 230 and the gate lines 224 are coupled to the gate selection circuitry 232. The data lines 222 may also be referred to as source lines, source electrodes, or data electrodes. Further, the gate lines 224 may also be referred to as gate electrodes. The subpixels 226 are coupled to the gate lines 224 and the data lines 222.

In one embodiment, display panel 220 may be an organic light emitting diode (OLED) display panel. In such embodiments, each subpixel 226 includes display circuitry comprising one or more transistors, one or more capacitors, and an anode electrode coupled to a data line 222 and a gate line 224. Alternatively, in various embodiments, the display panel 220 may be a liquid crystal display (LCD) panel. In such embodiments, each subpixel 226 includes display circuitry comprising one or more transistors, one or more capacitors, and a pixel electrode coupled to a data line 222 and a gate line 224.

In one embodiment, the gate selection circuitry 232 is configured to drive gate select and gate deselect signals onto the gate lines 224 to select (active) and deselect (deactivate) the subpixels 226 for updating. The gate select signal may be referred to a gate high signal or $V_{GH}$ and the gate deselect signal may be referred to a gate low signal or $V_{GL}$. In one embodiment, $V_{GH}$ is a positive voltage and $V_{GL}$ is a negative voltage. Further, $V_{GH}$ and $V_{GL}$ correspond to the turn-on and turn-off voltages of the transistors of the subpixels 226 configured to control activation and deactivation of the subpixels. In one example embodiment, $V_{GH}$ is about 15 V and $V_{GL}$ is about −10 V. However, other voltages may be used. Each of the gate lines 224 may be coupled to a respective one or more of the rows of subpixels 226. In one embodiment, a common row of subpixels 226 may be referred to as a display line of the display panel 220. Each subpixel 226 of a display line may be coupled to a common gate line 224 or the subpixels of a display line may be coupled to two or more gate lines.

The gate selection circuitry 232 may include one or more shift registers and may be coupled to the display driver 230. The display driver 230 may provide one or more clock signals to the gate selection circuitry 232, and the gate selection circuitry 232 may utilize the one or more clock signal to control the selection and deselection of the gate lines 224 for updating. In one embodiment, the control signals include clock signals. The control signals may be also, or alternatively, utilized to control display line update timing and/or display frame blanking timing.

Each data line 222 is coupled to a column of subpixels 226. Further, data line 222 is configured to drive a subpixel data signal onto each of the subpixels 226 for updating an image displayed by the display panel 220. In one embodiment, a subpixel that has been selected for updating by gate selection circuitry 232 may be driven with a subpixel data signal by the display driver 230 via a corresponding one of the data lines 222. In one embodiment, the subpixel data signal is a voltage signal.

In various embodiments, two or more of the data lines 222 may be simultaneously driven with a corresponding subpixel data signal to simultaneously update each selected (e.g., activated) subpixel along a selected gate line. In one embodiment, the period corresponding to when each subpixel coupled to a common gate line 224 and/or in a common row is updated may be referred to a display line update period.

Each of the subpixels 226 comprises subpixel circuitry including two or more transistors configured to control the activation and deactivation of each subpixel and current flow through each subpixel for updating. In an OLED configuration, the subpixel circuitry for each subpixel 226 is coupled to a corresponding gate line 224, data line 222 and an anode electrode. While not illustrated, the display panel 220 includes a cathode electrode. The cathode electrode may be a sheet of resistive material configured to overlap one or more of the subpixels 226. The cathode electrode may be coupled with and driven by the display driver 230 to supply a low impedance reference voltage. In one embodiment, the voltage across a subpixel 226 and the current to the cathode electrode from an anode electrode corresponds to the amount of light that is emitted by each subpixel 226. In an LCD configuration, the subpixel circuitry for each subpixel 226 is coupled to a corresponding gate line 224, data line 222 and a subpixel electrode. While not illustrated, in such embodiments, the display panel 220 includes one or more common voltage, e.g., Vcom, electrodes. The Vcom electrode or electrodes may be vertically or horizontally separated from the subpixel electrodes of each subpixel 226. The Vcom electrode may be coupled with and driven by the display driver 230 to supply a reference voltage. In one embodiment, difference in voltage between a subpixel 226 and the Vcom electrode corresponds to the amount of light that is emitted by each subpixel 226.

The display driver 230 is configured to update the subpixels 226 to update an image displayed on the display panel 220 during display frames. The display frames may be updated, or refreshed, once about every 16 ms, generating a display refresh rate of about 60 Hz. In other embodiments, other display refresh rates may be employed. For example, the display refresh rate may be 90 Hz, 120 Hz, 240 Hz, or greater. Also, it may be updated at 15 Hz or lower frequencies in a reduced power mode.

The display driver 230 may include source drivers that are each coupled to a respective one of data lines 222. The source drivers may include one or more amplifiers, DACs, buffers, and other drive circuitry configured to drive a corresponding subpixel data signal onto an activated subpixel. The drive circuitry may include one or more linear or non-linear digital to analog converters. In one or more embodiments, the display driver 230 may additionally include hardware and firmware elements configured to receive display data from a host device and process the display data to generate the subpixel data signals. For example, the display driver 230 may include a mobile industry processor interface (MIPI) receiver. Further, the display driver 230 may include a timing controller circuitry configured to generate control signals used for updating the display panel. The control signals may include selection circuitry clock signals.

The display driver 230 may generate control signals such as a vertical synchronization (VSYNC) signal to start and/or end a display frame. In one embodiment, the VSYNC signal is provided to gate selection circuitry 232 to provide an indication to the gate selection circuitry 232 to begin selection of the gate lines 224 for display updating. In one embodiment, the VSYNC signal may additionally or alternatively identify one or more vertical blanking periods within a display frame. For example, the VSYNC signal may be utilized to reset one or more shift registers of the selection circuitry.

The display driver 230 may additionally generate a control signal such as a horizontal sync (HSYNC) signal that corresponds to the start of a display line update period and/or to an end of a display line update period. An end of a display line update period may correspond to a cycle of the gate selection circuitry clock control signals provided by the display driver 230 and a transition to a new voltage on a data line. The display driver 230 may output the HSYNC signal to gate selection circuitry 232 to control selection and deselection of gate lines 224. In one embodiment, the HSYNC sync signal may additionally or alternatively identify one or more blanking periods that correspond to a display line update period.

In one embodiment, the display driver 230 utilizes a control signal such as a display enable signal that may be a composite signal of both the HSYNC and VSYNC signals, and may identify the start time of a display frame, an end time of a display frame, horizontal blanking periods corresponding to a display line update period, and/or vertical blanking periods within a display frame. In one embodiment, only a portion of the subpixels 226 may be updated during each display frame. For example, the portions of the subpixels 226 determined to have not changed from display frame to display frame may not be updated.

In one embodiment, gate selection circuitry 232 may share an IC chip with display driver 230. In other embodiments, the gate selection circuitry 232 may be disposed within a first IC chip and the display driver 230 may be disposed within a second IC chip. In such embodiments, a synchronization mechanism may be used to communicate control signals between display driver 230 and gate selection circuitry 232.

In various embodiments, the sensing device 240 includes sensor electrodes 260 and sensor driver 250. The sensor driver 250 includes a sensor module 252, clock synchronization circuitry 254, blocking pulse generator 256, and the determination module 258. The sensor module 252 may include hardware and firmware elements configured to drive the sensor electrodes 260 to acquire sensor data and to process the sensor data that may be used in the determination of changes in capacitive coupling and/or positional information for an input object (e.g., the input object 140). For example, the sensor module 252 may include receiver circuitry configured to receive resulting signals from one or more of the sensor electrodes 260 and transmitter circuitry configured to drive sensing signals onto one or more of the sensor electrodes 260 for capacitive sensing. The transmitter circuitry may include one or more amplifiers configured to drive sensing signals onto sensor electrodes. The amplifiers may correspond to one or more buffers or modulators. Further, the receiver circuitry may include analog front ends (AFEs) configured to receive resulting signals from sensor electrodes. In one embodiment, the receiver circuitry may include a continuous time mixer for receiving and processing resulting signals. As compared to other receiver circuitry techniques, receiver circuitry comprising a continuous time mixer may continuously receive and sample resulting signals received from the sensor electrodes 260.

In one embodiment, receiving the resulting signals may comprise sampling the resulting signals to generate one or more samples. Further, receiving the resulting signals may comprise accumulating charge.

In various embodiments, the determination module 258 may receive a resulting signal from the sensor module 252 and may determine a measurement of a change in capacitive coupling for one more of the sensor electrodes 260. In one embodiment, the determination module 258 compensates for a baseline to determine the measurements of the changes in capacitive coupling. Compensating for a baseline may include acquiring a baseline measurement when no input objects are determined to be in the sensing region 120 and subtracting the baseline measurement from the resulting signals or a capacitive measurement determined from the resulting signals. In one embodiment, compensating for a baseline may mitigate interference from within the resulting signals.

In one embodiment, a first portion of the sensor electrodes 260 may be driven with transmitter signals such and operated as transmitter electrodes, and a second portion of the sensor electrodes 260 may be utilized to receive resulting and operated as receiver electrodes, to perform transcapacitive sensing. For example, the sensor electrodes 260a may be operated as transmitter electrodes and the sensor electrodes 260b may be operated as receiver electrodes. In another example, the sensor electrodes 260b may be operated as transmitter electrodes and the sensor electrodes 260a may be operated as receiver electrodes.

In one embodiment, the sensor module 252 is configured to drive the transmitter electrodes with a transmitter signal such that the transmitter electrodes are modulated relative to the receiver electrodes. For example, the transmitter signal may be a varying voltage signal that varies between at least two voltages. In one embodiment, the transmitter signal includes a plurality of sensing bursts. Further, each sensing bursts includes a plurality of voltage transitions. The sensor module 252 may be configured to maintain the receiver electrodes at a substantially constant voltage (e.g., relative to system ground) or modulate the receiver electrodes when performing transcapacitive sensing. In one embodiment, when the receiver electrodes are modulated (e.g., relative to system ground), the transmitter electrodes are modulated relative to the receiver electrodes, such that the transmitter electrodes are modulated at a different phase, polarity, amplitude, and/or frequency than the receiver electrodes. The sensor driver 250 receives resulting signals with the receiver electrodes and measures the resulting signals to determine a change in capacitive coupling between the receiver electrodes and the transmitter electrodes. In another embodiment, when the receiver electrodes are modulated (e.g., relative to system ground), the transmitter electrodes may be modulated similar to the receiver electrodes, such that the transmitter electrodes are modulated to guard the receiver electrodes and minimize coupled charge from the transmitter electrodes to the receiver electrodes. In one embodiment, the substantially constant voltage may be a panel power supply voltage (e.g., Cathode voltage).

The sensor module 252 may be configured to drive each of the transmitter electrodes one at a time, or simultaneously drive at least two of the transmitter electrodes. In one embodiment, the sensor module 252 is configured to simultaneously drive at least two transmitter electrodes with different transmitter signals based on different codes or frequencies. For example, multiple transmitter electrodes may be simultaneously driven with transmitter signals which are modulated with substantially orthogonal coded sequences (e.g., amplitude shifted, phase shifted, frequency shifted). The corresponding resulting signals may be decoded to independently measure the coupling of between the transmitter electrodes and the receiver electrodes.

In another embodiment, the sensor electrodes 260 are operated for absolute capacitive sensing by the sensor module 252. In such an embodiment each of the sensor electrodes 260 may be modulated relative to a reference voltage (e.g., system or device ground, cathode voltage, etc.) with an absolute capacitive sensing signal by the sensor module 252, and the sensor module 252 receives resulting signals from the modulated sensor electrodes. The determination module 258 may be configured to determine changes in a capacitive coupling between each modulated sensor electrode and an input object, such as input object 140, from the resulting signals. In one embodiment, all of sensor electrodes 260 may be simultaneously operated for absolute capacitive sensing, such that a different resulting signal is simultaneously received from each of the sensor electrodes or a common resulting signal from two or more sensor electrodes. In another embodiment, the sensor electrodes 260*a* may be operated for absolute capacitive sensing during a first period and sensor electrodes 260*b* may be operated for capacitive sensing during a second period that is non-overlapping with the first period. For example, to allow sharing of receiver circuitry between the two sets of sensor electrodes 260*a* and 260*b*, the sensor electrodes 260*a* and 260*b* may be operated for absolute capacitive sensing during non-overlapping periods. When the sensor electrode 260*a*, 260*b* are not operated for absolute capacitive sensing, the sensor electrodes may be modulated with a guard signal to minimize charge coupling between the sensor electrodes operated for absolute capacitive sensing and the sensor electrodes not operated for absolute capacitive sensing. The guard signal and the absolute capacitive sensing signal may be similar in at least one of phase, amplitude and polarity. Further, one or more of the sensor electrodes 260*a*, 260*b* may be over-guarded to subtract excess charge from the other set. Over-guarding may include driving one or more of the sensor electrodes 260*a*, 260*b* with a guard signal having a similar phase to the absolute capacitive sensing signal, but with a larger amplitude than the absolute capacitive sensing signal.

In various embodiments, the sensor electrodes 260 may be substantially rectangular in shape. In other embodiments, the sensor electrodes 260 may have other shapes (e.g., connected diamond shapes, connected hexagons, etc.). Further, each of the sensor electrodes 260 may have the same shape and/or size. In other embodiments, at least one sensor electrode on one axis may have a different shape and/or size than another sensor electrode on another axis (e.g., to reduce user input coupled interference on one axis). For example the sensor electrodes 260 may be diamond shaped, have interdigitated fingers to increase field coupling, and/or have floating cut-outs inside to reduce stray capacitance to the display panel 220 and increase input device ground coupling. Further, the sensor electrodes may be routed in two or more layers (e.g., crossing with jumpers, or routing in one layer with user input coupling electrodes substantially formed in a second layer), or within a single layer (e.g., jumpered or multiplexed outside of the active area of the display panel 220).

The sensor electrodes 260 may be disposed on a lens and/or encapsulation of display panel 220. In one embodiment, each of the sensor electrodes 260 may be disposed on a common substrate which is adhered to the lens. Further, the sensor electrodes 260 may be disposed in a common layer. For example, the sensor electrodes 260 may be disposed in an array, where the sensor electrodes do not intersect with each in the sensing area of the sensing device 240. Alternatively, one of sensor electrodes 260*a* and 260*b* may include jumpers patterned on a separate layer which interconnect sensor electrodes 260*a* or 260*b* and crossover respective ones of the other one of sensor electrodes 260*a* and 260*b*. The jumpers are insulated from the sensor electrodes that they crossover such that they don't ohmically couple to those sensor electrodes.

Alternatively, sensor electrodes 260*a* may be disposed on a first layer, and sensor electrodes 260*b* may be disposed on a second layer different from the first layer. For example, the sensor electrodes 260*a* may be disposed on the lens, encapsulation layer, or another substrate of the display panel 220, and sensor electrodes 260*b* may be disposed on a substrate external to the display panel. In such an embodiment, the external substrate may be adhered to the lens of the display panel 220, or another substrate of the display panel 220, by an optically clear adhesive (OCA).

In one embodiment, sensor electrodes 260*a* and 260*b* may be disposed on different sides or a common side of a substrate which is adhered to the display panel 220. For example, the sensor electrodes 260*a* and 260*b* may be disposed on different sides of a substrate, and the substrate may be adhered to the lens of the display panel 220, an encapsulation layer of the display panel 220 or another substrate of the display panel 220. In another embodiment, sensor electrodes 260*a* are disposed on a first substrate and sensor electrodes 260*b* are disposed on a second substrate, and both substrates are then coupled to display panel 220.

For example, the first and second substrates may be adhered to the lens, the encapsulation layer, or any other substrate within the display panel 220.

The areas of localized capacitive sensing of capacitive couplings may be termed "capacitive pixels." The capacitive pixels may be formed between an individual sensor electrode and a reference voltage in embodiments employing absolute capacitive sensing methods and between groups of sensor electrodes used as transmitter and receiver electrodes in embodiments employing transcapacitive sensing methods (e.g., where fringing fields couple neighboring electrodes most strongly). For example, in an embodiment employing absolute capacitive sensing, the capacitive pixels may be formed between where parallel fields from an input object (e.g., input object 140) couple to system ground of the input device 100. Further, in embodiments employing transcapacitive sensing method, the capacitive pixels may be formed where fringing field lines couple to neighboring sensor electrode most strongly.

A set of measurements between sensor electrodes or between sensor electrodes and an input object may be utilized by the determination module 258 to form the capacitive pixels of a "capacitive image" or points along one or more capacitive profiles (also "capacitive frame"). In one embodiment, the rate at which the full capacitive images are acquired is the capacitive frame rate (or sensing rate). For example, a full capacitive image (e.g., composed of multiple measurement bursts of modulation or filtered and accumulated ADC conversions) may be acquired once every 16 ms, generating a capacitive frame rate of 60 Hz. In other embodiments, the capacitive frame rate may be about 90 Hz, 120 Hz, 240 Hz, or greater. Further, in one or more embodiment, the capacitive frame rate may be less than 60 Hz (e.g., for low power sensing) and/or the number or type of bursts may be reduced or changed to lower power.

Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region, or alternately report an input object hovering (e.g., proximate to, but not in contact with an input surface of the input device 100), touching (e.g., in contact with an input surface of the input device 100), pressing on the input surface of the input device or lifting from a the input surface of the input device 100 for various GUI implementations.

In some input device embodiments, one or more of the sensor electrodes 260 comprise one or more display electrodes used in updating the display of the display panel. For example, one or more of the sensor electrodes 260 may be formed from a segmented Vcom electrode of the display panel 220. In such an embodiment, the display panel 220 may be a liquid crystal display (LCD) panel. Further, one or more of the sensor electrodes 260 may be formed from one or more the data lines 222, and the gate lines 224. Further, in embodiments where the display panel 220 is an OLED panel, one or more of the sensor electrodes 260 may be formed from one or more of the data lines 222, the gate lines 224, anode electrodes of the subpixels 226, and the cathode electrode.

In various embodiments, the "capacitive frame rate" (the rate at which successive capacitive images are acquired) may be the same or be different from that of the "display frame rate" (the rate at which the display image is updated, including refreshing the screen to redisplay the same image). In various embodiments, the capacitive frame rate is an integer multiple of the display frame rate. In other embodiments, the capacitive frame rate is a fractional multiple of the display frame rate. In yet further embodiments, the capacitive frame rate may be any fraction or integer of the display frame rate. Further, the capacitive frame rate may be a rational fraction of the display rate (e.g., 1/2, 2/3, 1, 3/2, 2). In one or more embodiments, the display frame rate may change while touch frame rate maintains constant. In other embodiment, the display frame rate may remain constant while the touch frame rate is increased or decreased. Alternately, the capacitive frame rate may be unsynchronized from the display refresh rate or the capacitive frame rate may be a non-rational fraction to minimize interference "beat frequencies" between the display updating and the input sensing.

In one or more embodiments, capacitive sensing (or input sensing) and display updating may occur during at least partially overlapping periods. For example, as the display panel 220 is driven for display updating, the sensor electrodes 260 may also be driven for capacitive sensing. In another embodiment, capacitive sensing and display updating may occur during non-overlapping periods, also referred to as non-display update periods. In one such embodiment, the non-display blanking period may be between the last line of a display frame and the first line of the following display frame (e.g., during a vertical blanking period). In various embodiments, the non-display update periods may occur between display line update periods for two consecutive display lines of a display frame and may be at least as long in time as the display line update period. In such embodiments, the non-display update period may be referred to as a long horizontal blanking period, long h-blanking period or a distributed blanking period, where the blanking period occurs between two display updating periods within a frame and is at least as long as a display line update period. In one embodiment, the non-display update period occurs between display line update periods of a frame and is long enough to allow for multiple transitions of the transmitter signal to be driven onto the sensor electrodes to be sampled and filtered. In other embodiments, the non-display update period may comprise horizontal blanking periods and vertical blanking periods. Further, the combination of horizontal blanking periods and vertical blanking periods present in the non-display update period or periods may depend on the a selected interference level and selected report rate for the measurement. Further, the types of input sensing performed may be used to determine the combination of horizontal blanking periods and vertical blanking periods present in the non-display update period or periods. For example, hover sensing may be performed between display frames and touch detection may be performed during display frames.

In one or more embodiments, the sensor module 252 is configured to operate the sensor electrodes 260 for capacitive sensing while the display driver 230 operates the gate lines 224, and data lines 222 to update an image displayed by the display panel 220.

In one or more embodiments, the display driver 230 may be communicatively connected with sensor driver 250 via a communication line. For example, the display driver 230 may configured to communicate control signals to the sensor driver 250. For example, the display driver 230 may communicate one or more of a HSYNC signal, a VSYNC signal to the sensor driver 250, and other clock signals. In one embodiment, the clock synchronization circuitry 254 receives the control signals from the display driver 230 and generates one or more clock signals for the sensor driver 250

(e.g., internal clock signals) from the control signals provided by the display driver 230.

In one or more embodiments, processing system 110 may comprise one or more of the display driver 230 and the sensor driver 250. In one embodiment, processing system 110 includes both of the display driver 230 and the sensor driver 250. Further, the display driver 230 may be part of a first IC chip and the sensor driver 250 may be part of a second IC chip. In other embodiments, the display driver 230 and the sensor driver 250 are disposed on a common IC chip.

Figure 3A:
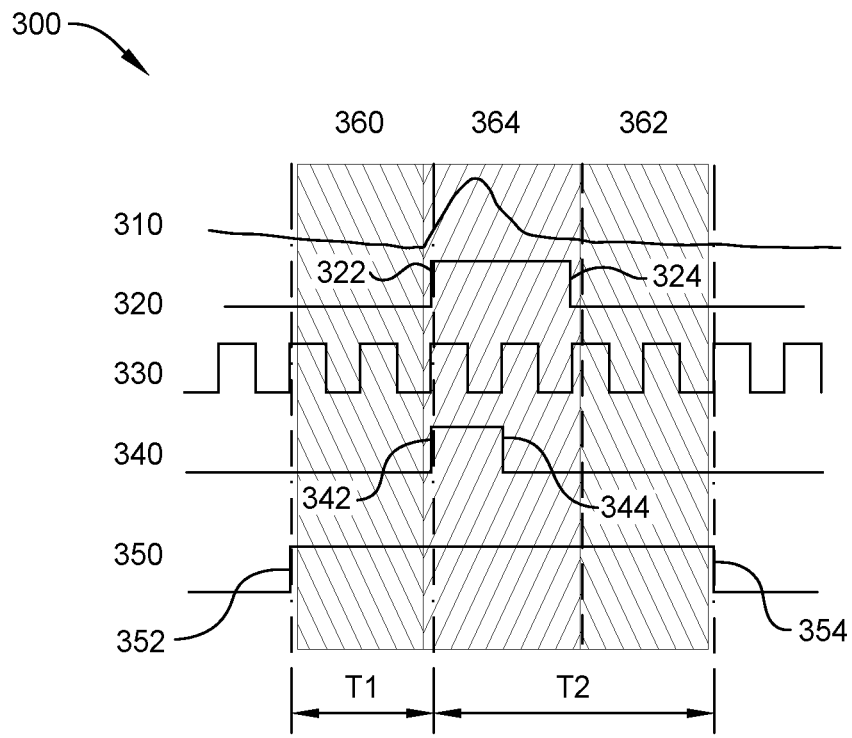
FIGS. 3A and 3B illustrates example signal traces, according to one or more embodiments.

FIG. 3A illustrates signal traces 300, according to one or more embodiments. The clock synchronization circuitry 254 may generate an internal clock signal 340 from one or more control signal provided by the display driver 230. In one embodiment, an HSYNC signal 320 is received by the clock synchronization circuitry 254 from the display driver 230. The clock synchronization circuitry 254 synchronizes the internal clock signal 340 with the HSYNC signal 320 based on the master clock signal 330 of the sensor driver 250 and the HSYNC signal 320. The HSYNC signal 320 may be referred to as an external clock signal as the HSYNC signal 320 is generated external to the sensor driver 250. For example, the HSYNC signal 320 may be generated by the display driver 230 or a processor of the input device 100 (e.g., a host processor). The master clock signal (e.g., the master clock signal 330) includes a plurality of pulses, each having a rising edge and a falling edge. The internal clock signal (e.g., internal clock signal 340) may include a plurality of pulses, each having a rising edge and a falling edge. The internal clock signal 340 may be aligned with the master clock signal 330 such that a rising edge of a first pulse of the internal clock signal 340 is aligned with a rising edge of a first pulse of the master clock signal and a falling edge of the internal clock signal 340 is aligned with a rising edge of a second pulse of the master clock signal 330. In one embodiment, the length of the pulse of the internal clock signal 340 is longer than a pulse of the master clock signal 330.

In various embodiments, a frequency ratio is maintained between the master clock signal 330 and the HSYNC signal 320, such that the internal clock signal 340 is synchronized with the HSYNC signal 320. In one embodiment, the clock synchronization circuitry 254 tracks the frequency of the HSYNC signal 320 and adjusts the frequency of the master clock signal 330 based on the frequency of the HSYNC signal 320.

For example, as illustrated in FIG. 3C, the clock synchronization circuitry 254 may include a counter 370 that receives the HSYNC signal 320 and counts how many pulses of the master clock signal 330 occurs for every "N" pulses of the HSYNC signal 320. "N" depends on the ratio between the master clock signal 330 and the HSYNC signal 320. The output of the counter 370 may be provided to a control circuitry 372. The control circuitry 372 may be configured to generate an indication to increase or decrease the frequency of the master clock signal 330 based on the output of the counter 370. Further, the output of the control circuitry 372 may additionally include an amount to increase or decrease the frequency of the master clock signal 330. The control circuitry 372 may include one or more of a control loop mechanism and a fine tune register. The clock synchronization circuitry 254 further includes an oscillator 374 configured to generate the master clock signal 330 based on the indication provided by the output of the control circuitry 372. For example, the oscillator 374 may increase or decrease the frequency of the master clock signal 330 based on the indication provided by the control circuitry 372. Further, the frequency of the master clock signal 330 can be adjusted to maintain the frequency ratio between the master clock signal 330 and the HSYNC signal 320. The oscillator 374 may generate and output the master clock signal 330 to one or more other elements of the clock synchronization circuitry 254. For example, the master clock signal 330 may be output by the oscillator 374 and utilized by the clock synchronization circuitry 254 to generate the internal clock signal 340. In various embodiments, the output of the counter 370 is a clock ratio. The clock ratio may be utilized as a reference to generate the internal clock signal 340 with increased accuracy.

Figure 3B:
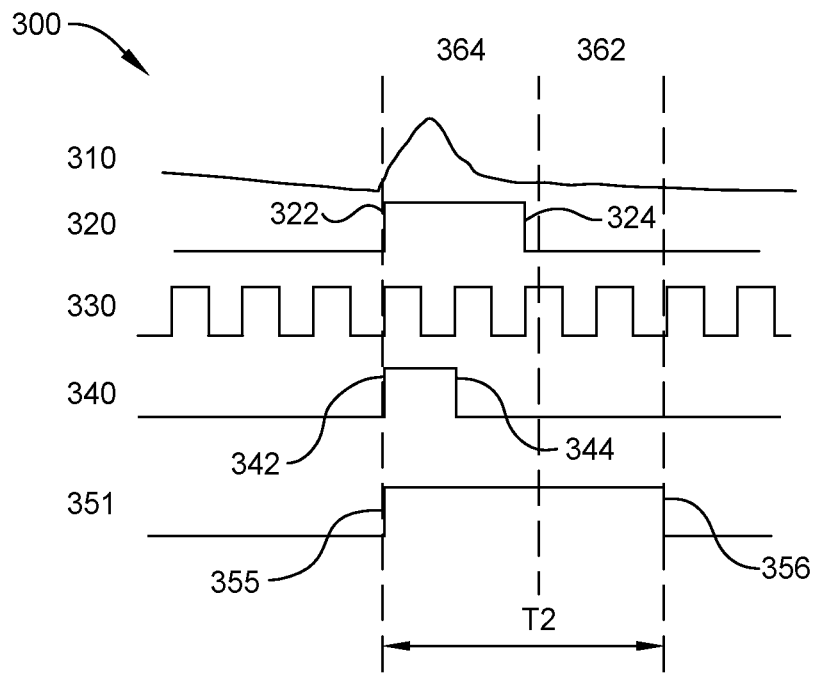

In one or more embodiments, the blocking pulse generator 256 generates a blocking pulse (e.g., the blocking pulse 350 of FIG. 3) from the internal clock signal (e.g., the internal clock signal 340). In one embodiment, the rising and falling edges 352, 354 of the blocking pulse 350 corresponds to at least one of the rising and falling edges of pulses of the master clock signal 330 and/or at least one of the rising and falling edges of a pulse of the internal clock signal 340. In one embodiment, the rising edge 352 of the blocking pulse 350 occurs before the rising edge 342 of the internal clock signal 340 and the falling edge 354 of the blocking pulse 350 occurs after the falling edge 344 of the internal clock signal 340. Further, the rising edge 352 of the blocking pulse 350 occurs before the rising edge 322 of the HSYNC signal 320 and the falling edge 354 of the blocking pulse 350 occurs after the falling edge 324 of the HSYNC signal 320. In another embodiment, as illustrated in FIG. 3B, the rising edge 355 of the blocking pulse 351 is aligned with the rising edge 342 of the internal clock signal 340 and the falling edge 356 of the blocking pulse 351 occurs after the falling edge 344 of the internal clock signal 340. Further, in such an embodiment, the rising edge 355 of the blocking pulse 351 is aligned with the rising edge 322 of the HSYNC signal 320 and the falling edge 356 of the blocking pulse 350 occurs after the falling edge 324 of the HSYNC signal 320. Additionally, in such an embodiment, the guard band 360 may be omitted.

In various embodiments, the blocking pulse 350 is utilized by the sensor module 252 to adjust acquisition of the resulting signals from the sensor electrodes 260. For example, the sensor module 252 may pause acquisition, e.g., receipt and/or processing, of the resulting signals received from the sensor electrodes 260 based on the rising edge 352 of the blocking pulse 350. In one embodiment, pausing acquisition of the resulting signals received from the sensor electrodes 260 comprises pausing the processing of the resulting signals. For example, the sensor module 252 may pause the processing of the resulting signals during a period based on the duration of a blocking pulse, e.g., the blocking pulse 350. Pausing the processing of the resulting signals may comprise one or more of pausing the integration of the resulting signals, pausing the filtering of the resulting signals, pausing the demodulation of the resulting signals, and/or pausing the analog-to-digital (ADC) conversion of the resulting signals.

In another embodiment, pausing acquisition of the resulting signals comprises pausing receipt of the resulting signals. For example, the sensor module 252 may be disconnected, or decoupled, from the sensor electrodes 260 during a period based on the duration of a blocking pulse, e.g. the blocking pulse 350. Disconnecting the sensor module 252 may comprise disconnecting one or more input to the sensor module 252 from the sensor electrodes 260.

Further, pausing receipt of the resulting signals may comprise disconnecting, or decoupling, elements within the sensor module 252. For example, first circuitry of the sensor module 252 may be disconnected from second circuitry of the sensor module 252 for period based on the duration of a blocking pulse, e.g. the blocking pulse 350.

Adjusting the acquisition of the resulting signals based on the blocking pulse 350 allows the sensing device 240 to avoid interference generated by the display panel 220 in response to the HSYNC signal 320. For example, as one or more display lines of the display panel 220 is driven for display updating in response to the HSYNC signal 320, the noise pulse 310 is generated. The noise pulse 310 corresponds to at least one of the gate select signals driven on the gate lines 224 and the subpixel data signals driven on the data lines 222 to update the subpixels 226 of the display panel 220.

In one embodiment, the width of the blocking pulse 350 includes one or more guard bands 360, 362. Further, the width of the blocking pulse 350 corresponds to T1 and T2, where T1 is width of the guard band 360 and the T2 is the width of the guard band 362 and the width 364 of the noise pulse 310. The width of the guard bands 360, 362 may correspond to N number of pulses of the master clock signal 330, where N may be 0 or more. In one embodiment, the width of the guard bands 360, 362 may be the same. For example, the width of the guard bands 360, 362 may correspond to the same number of pulses of the master clock signal 330. In one or more embodiments, the width of the guard band 360 may be greater than the width of the guard band 362. For example, the guard band 360 may correspond to a larger number of pulses of the master clock signal 330 than the guard band 362. In various embodiments, the width of the guard band 362 may larger than that of the guard band 360. Further, one or more of the guard bands 360 and 362 may be omitted. For example, as shown in FIG. 3B, the guard band 360 may be omitted and the length of the guard band 362 corresponds to one or more pulses of the master clock signal 330.

In one embodiment, the width of the guard bands 360, 362, and the width of the blocking pulse 350 corresponds to the width 364 of the noise pulse 310. For example, the width of the guard bands 360, 362 may be determined such that the blocking pulse 350 is at least as large as the noise pulse 310. Further, the width of the guard bands 360, 362 may be determined such that the blocking pulse 350 is larger than the width of the noise pulse 310.

The parameters of the noise pulse 310 may be measured from the display panel 220. For example, the display panel 220 may be probed while the display panel 220 is updated and the noise generated by driving the gate lines 224 and/or data lines 222 to update one or more display lines in response to the HSYNC signal 320 may be measured. For example, the width, speed, and/or amplitude of the noise pulse 310 may be measured by probing the display panel 220 while the gate lines 224 and/or data lines 222 are driven to update the display lines in response to the HSYNC signal 320. In other embodiments, the width, speed, and/or amplitude of the noise pulse 310 may be simulated and used to determine the width of the guard bands 360, 362, and the blocking pulse 350.

The width of the guard bands 360, 362, and the width of the blocking pulse 350 may further correspond to jitter of the HSYNC signal 320. For example, over time, the rising edge 322 of the HSYNC signal 320 may shifted relative to the master clock signal 330. The shifting of the HSYNC signal 320 over time may be referred to as jitter. The jitter of the HSYNC signal 320 may be measured, e.g., accumulated, by the clock synchronization circuitry 254. Further, the width of the guard band 360 and/or 362 may be increased to account for the jitter, increasing the width of the blocking pulse 350 based on the jitter of the HSYNC signal 320. For example, increasing the width of the blocking pulse 350 may include increasing the width of at least one of the guard bands 360 and 362.

In various embodiments, the width of the guard band 360 may correspond to N pulses of the master clock signal 330 and the width of the guard band 362 may correspond to M pulses of the master clock signal 330. N and M may be integers such that the width of the guard band 360, the width of the guard band 362, and the width of the blocking pulse 350 correspond to an integer number of pulses of the master clock signal 330.

The sensor module 252 comprises a plurality of receivers. Each of the plurality of receivers may be a discrete time receiver or a continuous time receiver. In one embodiment, a discrete time receiver may sample a resulting signal after a corresponding sensor electrode has settled. In another embodiment, a continuous time receiver samples the entire resulting signal as the resulting signal is received by a sensor electrode.

Figure 4:
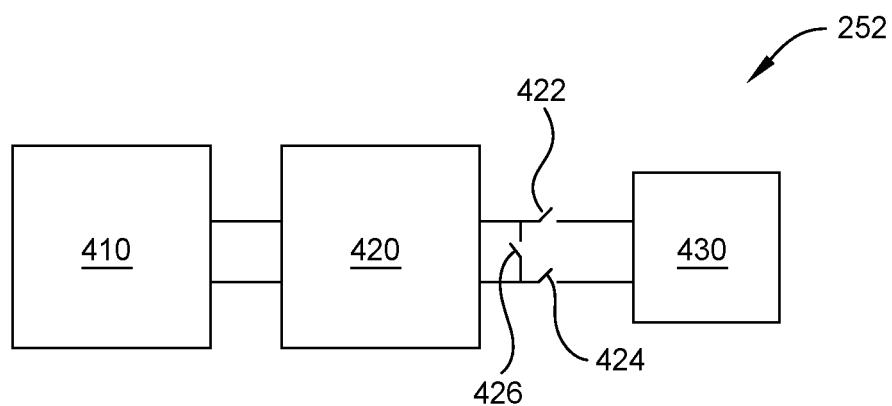
FIG. 4 is a schematic block diagram of sensor module, according to one or more embodiments.

FIG. 4 illustrates a portion of the sensor module 252, according to one or more embodiments. As illustrated, the sensor module 252 includes preprocessing circuitry 410, mixer 420, and an analog-to-digital (ADC) 430. In one embodiment, the sensor module 252 additionally includes an integrator coupled between the mixer 420 and the ADC 430. Alternatively, the ADC 430 includes the integrator. The preprocessing circuitry 410 may include a charge amplifier configured to convert a resulting signal (e.g., a charge signal) into a voltage signal.

The input of the mixer 420 is coupled to the preprocessing circuitry 410 and output of the mixer 420 is coupled to the ADC 430. The preprocessing circuitry 410 is configured to receive and process a resulting signal received from one of the sensor electrodes 260. For example, the preprocessing circuitry 410 may process the resulting signal to generate a current signal which is inputted into the mixer 420. The mixer 420 mixes the processed resulting signal with a mixing signal and outputs a mixer output signal to the ADC 430. In one embodiment, the ADC 430 is a sigma delta ADC. However, in other embodiments, other types of ADCs may be utilized. The ADC 430 converts the mixer output signal from analog domain to a digital domain. In one embodiment, the ADC 430 is coupled to the determination module 258, and communicates a digital output signal to the determination module 258.

The mixer 420 is coupled to the ADC 430 via switches 422, 424, and 426. The mixer 420 may be a square-wave mixer, harmonic rejection mixer, or a sinusoidal mixer, among others. In one embodiment, the mixer 420 generates direct current (DC) values. Further, the mixer 420 performs a polarity-switching function. The switches 422 and 424 connect and disconnect the output of mixer 420 from the input of the ADC 430. In one embodiment, the state of the switches 422, 424, and 426 corresponds to the blocking pulse 350. For example, the switches 422 and 424 may open in response to the rising edge 352 of the blocking pulse 350, disconnecting the mixer 420 from the ADC 430. In one embodiment, disconnecting the mixer 420 from the ADC 430 prevents the mixer 420 from processing the processed resulting signal and generating a mixer output signal. For example, the mixer output signal may be a current signal, and opening the switches 422 and 424 blocks the current signal from being output to the ADC 430 and converted into a digital signal. In one embodiment, as the blocking pulse 350 corresponds to pulses of the HSYNC signal 320, effects of the interference generated by the display panel 220 in response to the HSYNC signal 320 may be mitigated as the output of the mixer 420 is disconnected from the ADC 430 and signals are prevented from flowing from the mixer 420 to the ADC 430. Further, the switch 426 may be closed in response to the rising edge 352 of the blocking pulse 350. Closing the switch 426 bypasses the mixer 420 such that the mixer 420 may continue to function while the switches 422 and 424 are open. Bypassing the mixer 420 minimizes disturbance on the mixer 420 and it provides increased response time of the mixer 420 when the switches 422 and 424 are closed and the mixer 420 is connected to the ADC 430. In one embodiment, the mixer 420 is implemented as a digital-to-analog converter (DAC) mixer. Further, the frequency ($F_s$) of the mixer 420 may be synchronized with or asynchronized with the frequency ($F_{HSYNC}$) of the HSYNC signal 320. When the frequency of the mixer 420 is synchronized with the frequency of the HSYNC signal, $F_S=F_{HSYNC}$. Alternatively, when the frequency of the mixer 420 is asynchronized with the frequency of the HSYNC signal, $F_S \neq F_{HSYNC}$.

Figure 5A:
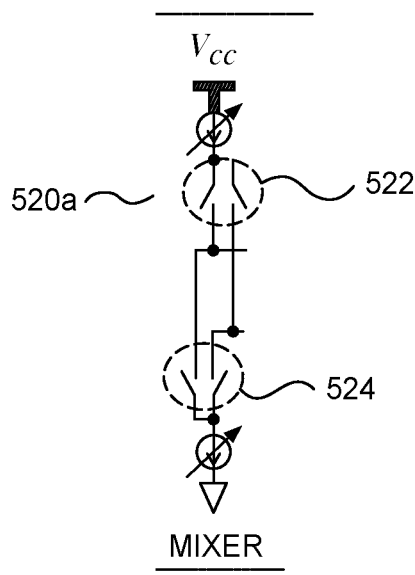
FIGS. 5A and 5B illustrate example mixers according to one or more embodiments.

FIG. 5A, illustrates an example mixer 520a where the mixer is implemented as a DAC mixer. In such an embodiment, a control signal controls the current source of the mixer 520a. The value of the control signal changes over time, controlling the amplitude of current provided to an integrator external to or internal to the ADC 430. The switches 522 and 524 control the direction function of the mixer 520a. For example, the switches 522 and 524 control which of the positive and negative inputs of the integrator external to or internal to the ADC 430 receives the output current of the mixer 520a.

Figure 5B:
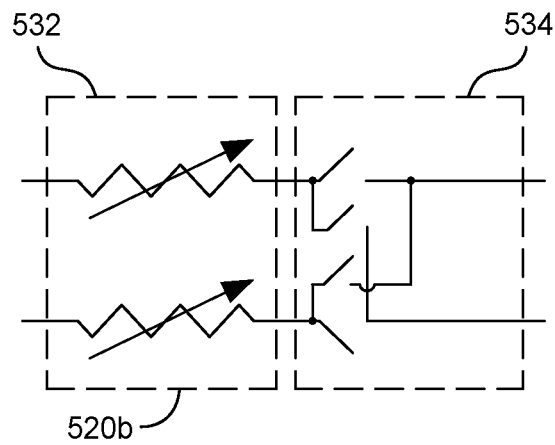

In another embodiment, the mixer 420 may be implemented using a resistor array. In such an embodiment, the mixer 420 receives the voltage signals from the preprocessing circuitry 410 and generates a mixer output signal. The output of the mixer 420 is output the ADC 430. For example, a mixer output signal is output by the mixer 420 to the ADC 430. In one embodiment, the switches 422 and 424 disconnect the output of the mixer 420 from the ADC 430. For example, the switches 422 and 424 open in response to the rising edge 352 of the blocking pulse 350. Further, the switch 426 may close in response to the rising edge 352 of the blocking pulse 350, bypassing the mixer 420. Disconnecting the mixer 420 from the ADC 430 in response to the rising edge 352 of the blocking pulse 350 mitigates the effects of display interference within a processed resulting signal. FIG. 5B, illustrates an example mixer 520b, where the mixer is implemented as a resistor array (e.g., resistor array 532). In one embodiment, the resistance of the resistors of the resistor array 532 is adjustable. For example, a control signal may be utilized to adjust the resistance values of the resistors of the resistor array 532. Adjusting the resistor values controls the current passing through the resistors. Further, the control signal may control the polarity of the switches 534 to control the direction function of the mixer 520b. For example, the switches 534 control which of the positive and negative inputs of the integrator external to or internal to the ADC 430 receives the output current of the mixer 520b.

The switches 422 and 424 may be closed in response to the falling edge 354 of the blocking pulse 350. Closing the switches 422 and 424 connects the output of the mixer 420 with the ADC 430. Further, the switch 426 may be opened in response to the falling edge 354 of the blocking pulse 350. Processing of the resulting signal is continued in response to the output of the mixer 420 being connected with the ADC 430.

In one embodiment, the switches 422, 424 and 426 may be omitted. In such an embodiment, the blocking pulse 350 is multiplied with the mixer waveform of the mixer 420 to generate a new mixer waveform with the blocking pulse embedded. In such an embodiment, the mixer 420 is operated at a faster speed than in an embodiment where the switches 422, 424, and 426 are included. For example, in an embodiment including the switches 422, 424, and 426, the mixer 420 is run at 32 $F_s$ and in embodiments where the switches 422, 424, and 426 are omitted, the mixer 420 is run at about 128 $F_s$. However, in other embodiments, the mixer 420 may be run at other speeds.

Figure 6:
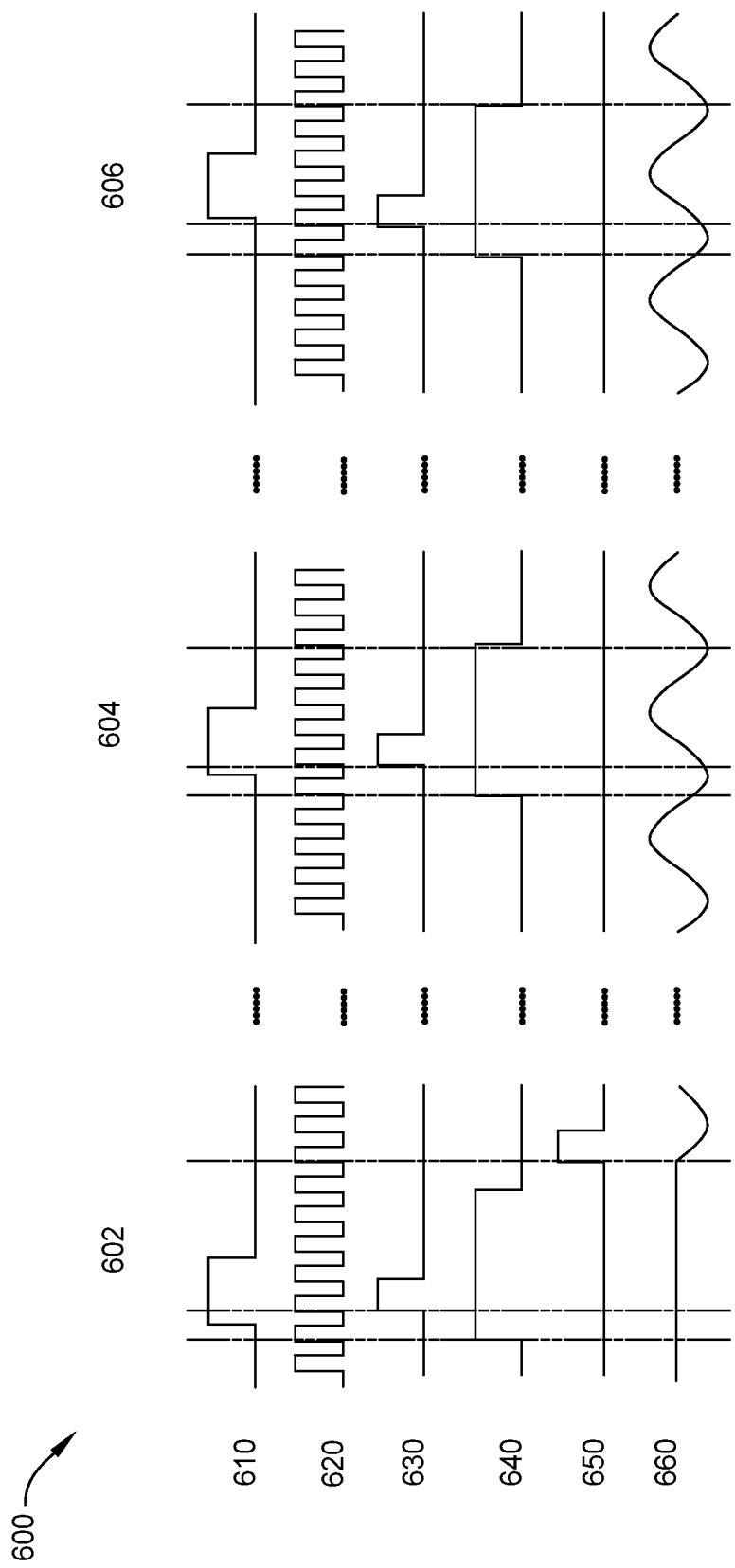
FIG. 6 illustrates example signal traces, according to one or more embodiments.

FIG. 6 illustrates signal traces 600, according to one or more embodiments. The HSYNC signal 610 may be generated by the display driver 230. Alternatively, the HSYNC signal 610 may be generated by a processor external to the display driver 230. For example, the processor external to the sensor driver 250 may be a host processor of an input device (e.g., the input device 100). The master clock signal 620, the internal clock signal 630, the blocking pulse 640, the burst start signal 650, and the sensing signal 660 may be generated by the sensor driver 250. Alternatively, one or more of the master clock signal 620, the internal clock signal 630, the blocking pulse 640, the burst start signal 650, and the sensing signal 660 may be generated by a processor external to the sensor driver 250. For example, the processor external to the sensor driver 250 may be a host processor of an input device (e.g., the input device 100) or the display driver 230. In one embodiment, the internal clock signal 630 may be referred to as an internal HSYNC signal. The master clock signal 620, the internal clocking signal 630, and the blocking pulse 640 are configured similar to that of the master clock signal 330, the internal clocking signal 340 and the blocking pulse 350 of FIG. 3, respectively. During period 602, the burst start signal 650 is initiated, or pulsed, after the falling edge of the blocking pulse 640. The sensing signal 660 may be driven on one or more of the sensor electrodes 260 in response to the rising edge of the burst start signal 650. The sensing signal 660 may be one of a transcapacitive sensing signal and an absolute capacitive sensing signal. Period 602 may correspond to a beginning of a capacitive frame that includes periods 604 and 606. As such, the burst start signal 650 may occur during the period 602 and not during the periods 604, 606. In one or more embodiments, the width of the blocking pulse 640 during period 602 may be smaller than the width of the blocking pulse 640 during period 604 and/or period 606. For example, during period 602, the width of the blocking pulse 640 may correspond to N pulses of the master clock signal 620, during period 604 the width of the blocking pulse 640 may correspond to M pulses of the master clock signal 620, and during period 606 the width of the blocking pulse 640 may correspond to L pulses of the master clock signal 620. N may be less than M and/or L. Further, M may be greater than, equal to, or less than L.

Figure 7:
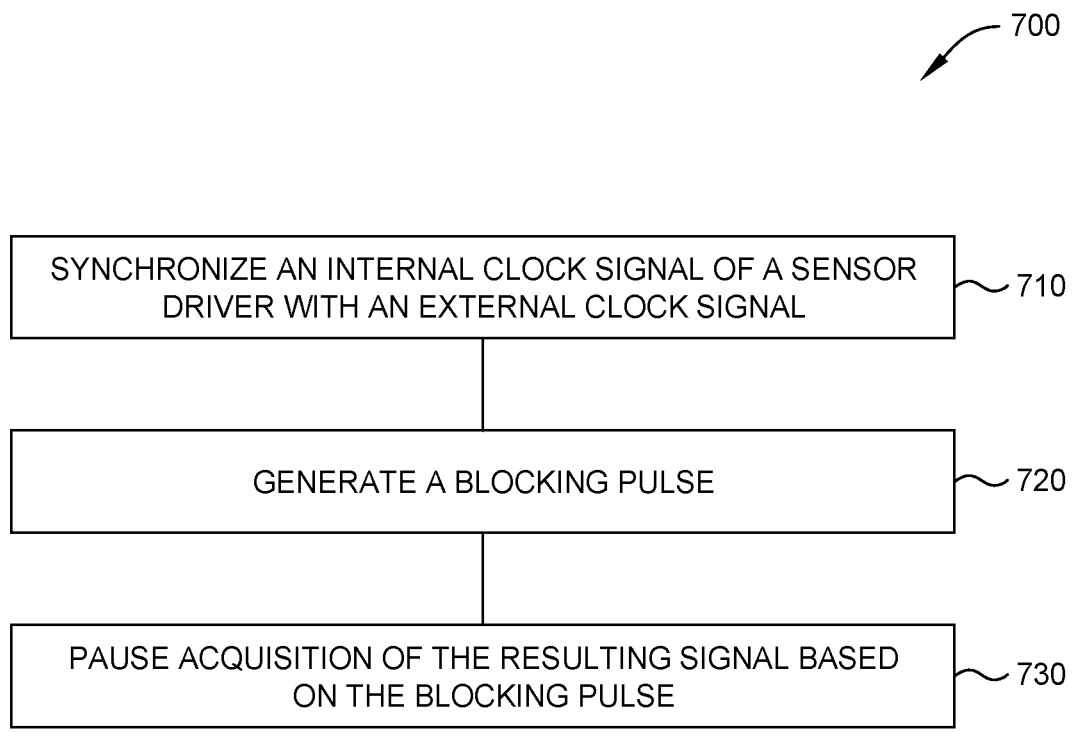
FIG. 7 illustrates a method for operating a sensing device, according to one or more embodiments.

FIG. 7 is a flow chart of method 700 for operating an input device, the input device 100, according to one or more embodiments. At operation 710, an internal clock signal of a sensor driver is synchronized with an external clock signal. For example, the sensor driver 250 may receive the HSYNC signal 610 from the display driver 230. The sensor driver 250 synchronizes the internal clock signal 340 based on the master clock signal 330 and the HSYNC signal 320. In one embodiment, a rising edge of the internal clock signal 630 is maintained "N" pulses of the master clock signal 330 from a rising edge of the HSYNC signal 320, where N is one or more.

At operation 720, a blocking pulse is generated. For example, the clock synchronization circuitry 254 of the sensor driver 250 generates the blocking pulse 350. The clock synchronization circuitry 254 generates the blocking pulse 350 based on the internal clock signal 340 and the master clock signal 330. For example, the clock synchronization circuitry 254 may initiate a rising edge of the blocking pulse 350 in response to a rising edge of a pulse of the master clock signal 330 that is either aligned with a rising edge of a pulse of the internal clock signal 340 or occurs "N" pulses before the rising edge 342 of the pulse of the internal clock signal 340. Further, the falling edge 354 of the blocking pulse 350 occurs "N" number of pulses of the master clock signal 330 after the falling edge 344 of the internal clock signal 340.

At operation 730, acquisition of a resulting signal is paused. In one embodiment, the sensor module 252 acquires resulting signals from one or more of the sensor electrodes 260. For example, in one embodiment, one or more of the sensor electrodes 260a may be driven with transmitter signals and one or more of the sensor electrodes 260b receives resulting signals corresponding to the transmitter signals. In another embodiment, the sensor module 252 modulates one or more or the sensor electrodes 260a and/or the sensor electrodes 260b with absolute capacitive sensing signals and receives resulting signals from the modulated sensor electrodes. The sensor module 252 preprocess the resulting signals with the preprocess circuitry 410 or 510 to generate one of a current signal and a voltage signal.

In one or more embodiments, pausing the acquisition of the resulting signals may comprise adjusting mixing of the resulting signal based on the blocking pulse. For example, with reference to FIG. 4, the switches 422 and 424 may be opened in response to the rising edge 352 of the blocking pulse 350. Opening the switches 422 and 424 disconnects the mixer 420 from an integrator internal to or external to the ADC 430, pausing the sampling of the resulting signals. In one embodiment, the switches 422 and 424 are closed in response to a falling edge of the blocking pulse 350. Closing the switches 422 and 424 connects the mixer 420 with the ADC 430, and sampling of the resulting signal resumes. Alternatively, the mixing signal used by the mixer 420 may be multiplied by the blocking pulse 350, pausing the sampling of the resulting signals.

Figure 8:
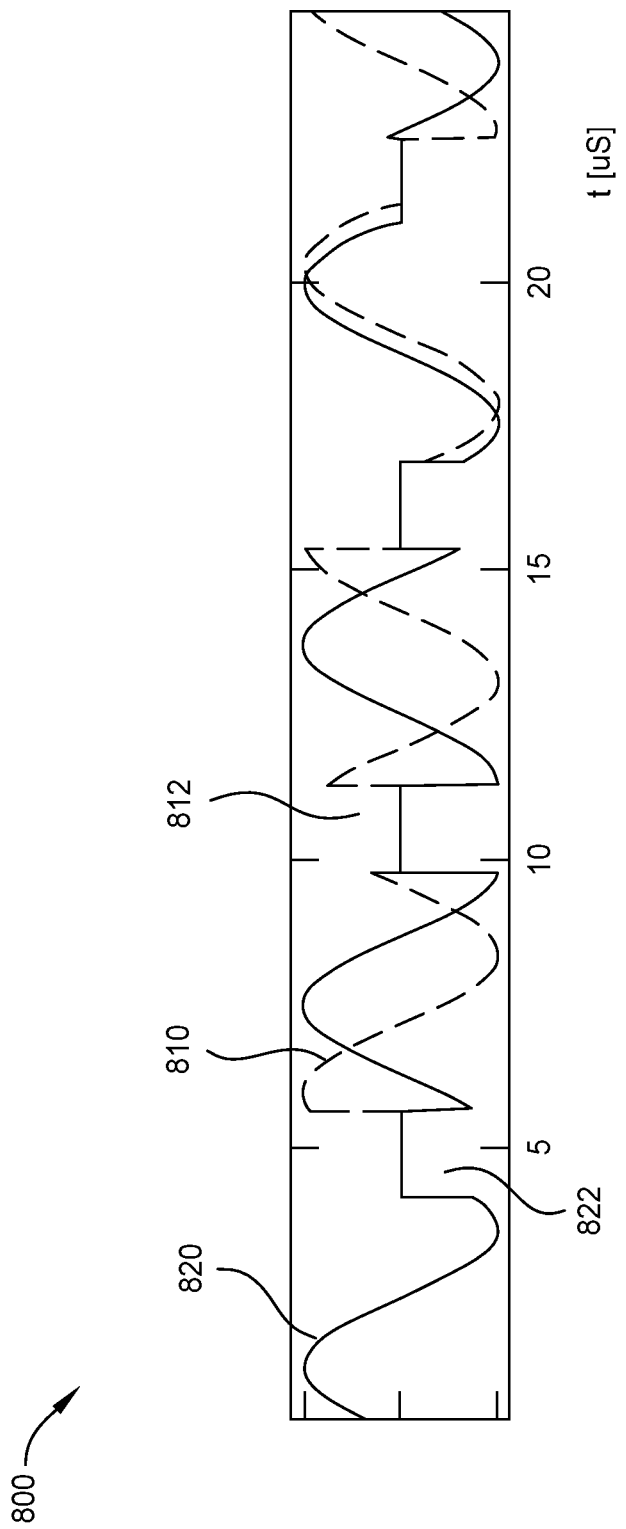
FIG. 8 illustrates example signal traces, according to one or more embodiments.

In one or more embodiment, pausing the acquisition of the resulting signals comprises multiplying the mixing signal used by the mixer 420 by the blocking pulse 350. For example, as is shown in FIG. 8, the mixing signal 810 may be generated by multiplying the mixing signal used by the mixer 420 by the blocking pulse 350. The mixing signal 810 includes "gaps" that coincide with the blocking pulse 350. In other embodiments, pausing the acquisition of the resulting signals comprises phase delaying the mixing signal used during mixing based on the blocking pulse 350. For example, as shown in FIG. 8, the phase of the mixing signal 820 includes a phase delay 822 that coincides with the blocking pulse 350.

In one embodiment, pausing the acquisition of the resulting signals comprises disconnecting the preprocessing circuitry 410 from a corresponding sensor electrode. For example, the preprocessing circuitry 410 may be coupled to one or more sensor electrodes via a switching mechanism and the switching mechanism, or switching device, may disconnect the preprocessing circuitry 410 from the sensor electrode in response to the blocking pulse 350. Further, in embodiments where the preprocessing circuitry 410 includes a charge amplifier the switching mechanism may disconnect charge amplifier from the sensor electrode in response to the blocking pulse 350.

In one embodiment, pausing the acquisition of the resulting signals comprises disconnecting the preprocessing circuitry 410 from the mixer 420. For example, the preprocessing circuitry 410 may be coupled to the mixer 420 via a switching mechanism, or switching device and the switching mechanism may connect and disconnect the preprocessing circuitry 410 from the mixer 420 in response to the blocking pulse 350.

In one embodiment, pausing the acquisition of the resulting signal comprises one or more of adjusting mixing of the resulting signal based on the blocking pulse, multiplying the mixing signal used by the mixer 420 by the blocking pulse 350, disconnecting the preprocessing circuitry 410 from a corresponding sensor electrode, and disconnecting the preprocessing circuitry 410 from the mixer 420.

Thus, the embodiments and examples set forth herein were presented in order to best explain the embodiments in accordance with the present technology and its particular application and to thereby enable those skilled in the art to make and use the disclosure. However, those skilled in the art will recognize that the foregoing description and examples have been presented for the purposes of illustration and example only. The description as set forth is not intended to be exhaustive or to limit the disclosure to the precise form disclosed.

What is claimed is:

1. A sensor driver comprising:
   clock synchronization circuitry configured to:
      receive an external clock signal from a source external to the sensor driver, wherein the external clock signal is generated by a display driver; and
      synchronize an internal clock signal of the sensor driver with the external clock signal;
   a blocking pulse generator configured to generate a first blocking pulse having at least one of a rising edge and a falling edge associated with the synchronized internal clock signal; and
   a sensor module comprising sensing circuitry and configured to pause acquisition of a resulting signal from a sensor electrode based on the first blocking pulse, wherein the sensor module further comprises:
   a mixer; and
   an analog-to-digital converter coupled to the mixer, wherein pausing the acquisition of the resulting signal comprises disconnecting the mixer from the analog-to-digital converter based on the rising edge of the first blocking pulse.

2. The sensor driver of claim 1, wherein a width of the first blocking pulse is wider than a width of a first pulse of the synchronized internal clock signal.

3. The sensor driver of claim 2, wherein the rising edge of the first blocking pulse occurs before or is aligned with a rising edge of the first pulse of the synchronized internal clock signal, and wherein the falling edge of the first blocking pulse occurs after a falling edge of the first pulse of the synchronized internal clock signal.

4. The sensor driver of claim 1, wherein a width of the first blocking pulse is larger than a width of a pulse of the external clock signal.

5. The sensor driver of claim 1, wherein the blocking pulse generator is further configured to generate a second blocking pulse, and wherein a width of the second blocking pulse is greater than or equal to a width of the first blocking pulse.

6. The sensor driver of claim 1,
wherein pausing the acquisition of the resulting signal comprises one of:
multiplying a mixing signal with the first blocking pulse; and
phase delaying the mixing signal with the first blocking pulse.

7. The sensor driver of claim 1, wherein synchronizing the internal clock signal of the sensor driver with the external clock signal comprises adjusting a master clock signal of the sensor driver based on the external clock signal.

8. A method for capacitive sensing, the method comprising:
synchronizing an internal clock signal of a sensor driver with an external clock signal generated by a display driver external to the sensor driver;
generating a blocking pulse having at least one of a rising edge and a falling edge associated with the synchronized internal clock signal; and
pausing acquisition of a resulting signal from a sensor electrode with receiver circuitry based on the blocking pulse, wherein pausing the acquisition of the resulting signal comprises disconnecting a mixer of the sensor driver from an analog-to-digital converter coupled to the mixer based on the rising edge of the blocking pulse.

9. The method of claim 8, wherein a width of the blocking pulse is wider than a width of a pulse of the synchronized internal clock signal.

10. The method of claim 8, wherein the rising edge of the blocking pulse is aligned with or occurs before a rising edge of a pulse of the synchronized internal clock signal.

11. The method of claim 10, wherein the falling edge of the blocking pulse is aligned with or occurs after a falling edge of the pulse of the synchronized internal clock signal.

12. The method of claim 8, wherein a width of the blocking pulse is larger than a width of a pulse of the external clock signal.

13. The method of claim 8, wherein pausing the acquisition of the resulting signal comprises one of:
multiplying a mixing signal of the mixer with the blocking pulse; and
phase delaying the mixing signal with the blocking pulse.

14. An input device comprising:
a plurality of sensor electrodes; and
a processing system coupled to the plurality of sensor electrodes, the processing system comprising:
a sensor driver having an internal clock signal and configured to:
receive an external clock signal from a display driver external to the sensor driver;
synchronize the internal clock signal with the external clock signal;
generate a blocking pulse having at least one of a rising edge and a falling edge associated with the synchronized internal clock signal; and
pause acquisition of a resulting signal from the sensor electrode of the plurality of sensor electrodes based on the blocking pulse, wherein the input device further comprises:
a mixer; and
an analog-to-digital converter coupled to the mixer, and wherein pausing the acquisition of the resulting signal comprises disconnecting the mixer from the analog-to-digital converter based on the rising edge of the blocking pulse.

15. The input device of claim 14, wherein a width of the blocking pulse is wider than a width of a pulse of the synchronized internal clock signal.

16. The input device of claim 14, wherein the rising edge of the blocking pulse is aligned with or occurs before a rising edge of a pulse of the synchronized internal clock signal.

17. The input device of claim 16, wherein the falling edge of the blocking pulse is aligned with or occurs after a falling edge of the pulse of the synchronized internal clock signal.

18. The input device of claim 14, wherein pausing the acquisition of the resulting signal comprises one of:
multiplying a mixing signal of the mixer with the blocking pulse; and
phase delaying the mixing signal with the blocking pulse.

19. The input device of claim 14 further comprising a display panel and wherein the display driver is configured to update the display panel, wherein the external clock signal is a horizontal synchronization signal of the display driver.

20. The sensor driver of claim 1 wherein the external clock signal generated by the display driver is a horizontal synchronization signal.

21. The method of claim 8, wherein the external clock signal generated by the display driver is a horizontal synchronization signal.

* * * * *